3,454,712
VISUAL SIMULATION APPARATUS
John Ernest Mottram, Aylesbury, England, assignor to Redifon Air Trainers Limited, Aylesbury, England, a British company
Filed May 19, 1966, Ser. No. 551,303
Claims priority, application Great Britain, May 19, 1965, 21,261/65
Int. Cl. H04n 7/00; G09b 9/08
U.S. Cl. 178—6                                  8 Claims

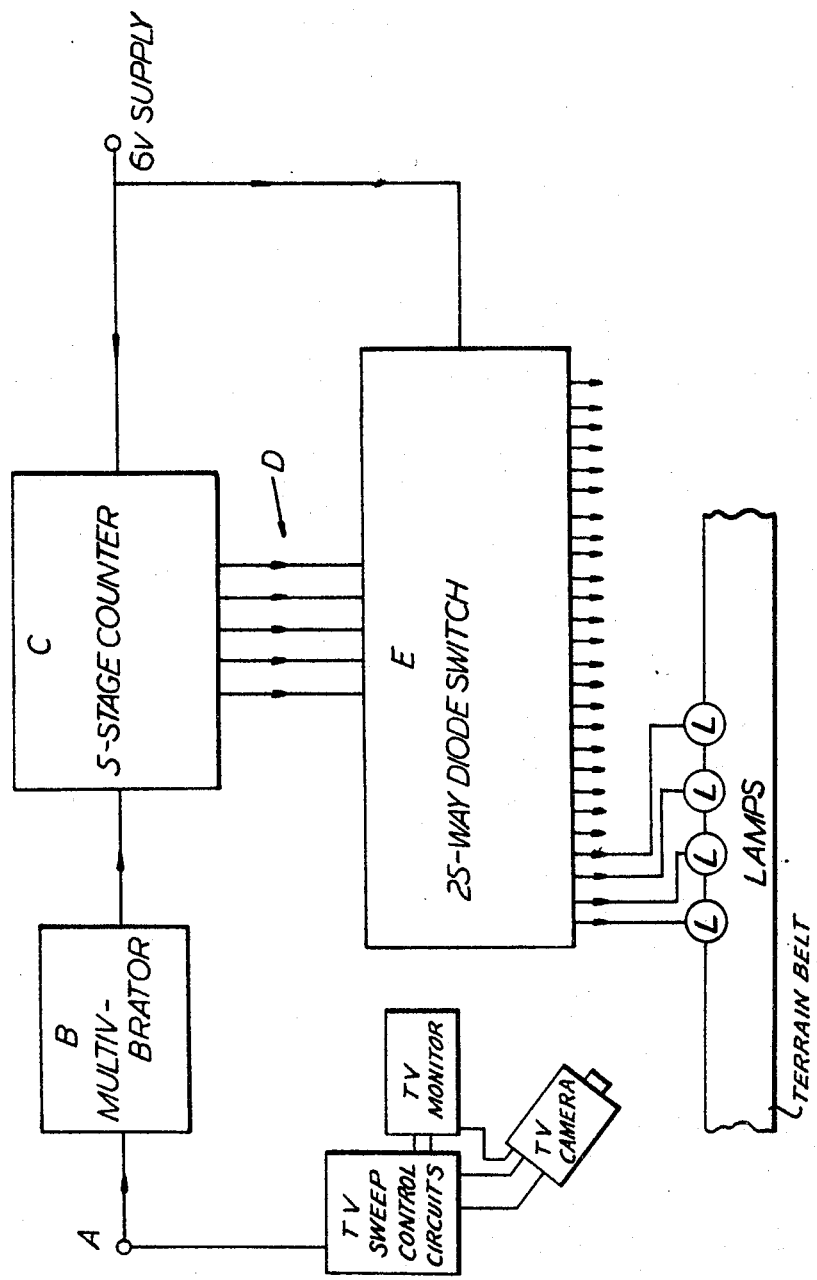

ABSTRACT OF THE DISCLOSURE

An arrangement for simulating airport approach strobe lighting in a visual display system wherein the camera of a closed-circuit television system views a relatively movable scale model of terrain. A multivibrator switched in synchronism with the camera field rate advances a multi-stage counter whose output controls switches to illuminate miniature terrain lamps individually in succession. The multivibrator has a free-running repetition rate so that it continues o advance the counter even during loss of the synchronizing signal. The counter and a switching circuit associated therewith may comprise miniature circuits mounted on the movable terrain model.

---

This invention relates to visual simulation apparatus of the kind in which a scale model of terrain is viewed by the relatively-moving camera of a closed-circuit system, and the picture obtained by the travelling camera is so displayed to an observer as to give him the visual impression of corresponding travel through or over the terrain represented by the model. The invention is especially applicable to apparatus in which the simulation is of flight in an aircraft and the model terrain includes an airport and its approaches: it will therefore for convenience be described in that context, although it will be apparent that it has other useful applications.

A feature of airports which it may be desirable to simulate is what is known as "strobe" approach lighting. This involves a line of high-intensity lights strung out along the approach terrain in alignment with the airport runway. These lights are briefly flashed in rapid and orderly succession, starting with the farthest out, and this cycle is continuously repeated to give the effect of a bright light continually sweeping towards the runway and providing useful guidance to approaching aircraft in bad weather.

Simulation of this will involve a corresponding line of miniature lamps in the terrain model and arrangementjs for automatically switching them on and off in the appropriate repeated sequence. According to this invention, the arangements provide for this switching to be electronically effected by the field or frame pulses of the television system, thereby positively avoiding the synchronisation problems which could arise with conventional motor-driven switching equipment.

A practical example of the invention, for operating a line of 25 miniature lamps, is diagrammatically illustrated by the accompanying drawing. At A an input connection applies television system field pulses (each of 0.5 millisecond duration and repeated at 50 per second) to control a multivibrator unit B, from which the pulses are applied to a 5-stage flip-flop digital counter unit C arranged to have 25 different successive states of its output combination circuit D in response to successive triggering by the input from B. This output combination D is decoded by a switch unit E comprising 25 diode gates appropriately switching (through transistor buffer stages) the miniature lamps L one at a time briefly to the 6 volt power supply. Arrangement of the internal circuitry of units B, C and E to operate as specified is in itself well understood by those skiled in such matters and does not require detailed description here.

For clarity only a few of the lamps L have been actually shown on the drawing, but it will be understood that in the example of the invention here discussed there is on the model a line of 25 of them, each switched by a different one of the 25 diode gates of unit E. Since the input pulse at A is repeated 50 times per second, the simulated strobe system formed by the lamps will execute its repetitive sweeps at half-second intervals, which is representative of such systems in real life.

The lamps will preferaby be such that they are very much "over-run" by their power supply (of 6 volts in the example illustrated) in comparison with their rating for safe continuous operation, so as to flash brightly when momentarily energised. Should the input pulsing at A fail or be discontinued for any reason, the multivibrator B will continue free running at its natural frequency, somewhat lower than 50 per second, to avoid a lamp remaining continuously-energised and so burning out.

The counter and switching units C and E may, by the use of subminiature components, be small enough to be hidden in, or disguised as, features of the model terrain such as hills or buildings. This is of particular advantage in apparatus in which the terrain modelling is on the face of a moving band or belt, where it will unable the number of slip ring connections required to be reduced to the single circuits respectively bringing the control pulses to unit C and the lamp supply voltage to unit E.

What I claim is:

1. Visual simulation apparatus, comprising, in combination: a scale model of terrain; a closed-circuit television system including a camera movable relative to said scale model of terrain and a television projection means viewable by an observer; a plurality of electric lamps arranged in a line and mounted on said scale model of terrain; and switching means for repeatedly energizing said lamps individually and in succession, said switching means comprising re-cycling electronic pulse counter means, timing responsive to input pulses from said television system for advancing said pulse counter means in synchronism with the field repetition rate of said television system, and gating circuit means responsive to the count in said counter means for energizing a different lamp during each state of said counter means.

2. Apparatus according to claim 1 in which said timing means includes a multivibrator connected to be switched in synchronism with said field repetition rate of said television system, said multivibrator having a substantial free-running natural repetition rate, whereby said multivibrator will continue to advance said counter means even in the absence of said input pulses from said television system.

3. Apparatus according to claim 1 in which said pulse counter means comprises a miniature electronic circuit mounted on said scale model of terrain.

4. Apparatus according to claim 1 in which said gating circuit means comprises a miniature electric circuit mounted on said scale model of terrain.

5. Apparatus according to claim 1 in which said pulse counter means and said gating circuit means each comprise miniature electric circuits mounted on said scale model of terrain.

6. Apparatus according to claim 1 wherein said scale model of terrain comprises a movable endless belt.

7. Apparatus according to claim 1 in which said plurality of electric lamps comprises 25 lamps and said field repetition rate of said television system is substantially 50 fields per second.

8. Apparatus according to claim 1 in which said field repetition rate of said television system in fields per second is an integral multiple of the number of lamps in said plurality.

References Cited

UNITED STATES PATENTS 3,390,229   6/1968   Williams _____ 178—6

FOREIGN PATENTS 834,661   5/1960   Great Britain.

RALPH D. BLAKESLEE, *Primary Examiner.*

B. LEIBOWITZ, *Assistant Examiner.*

U.S. Cl. X.R.

35—12